United States Patent
Shirley et al.

(10) Patent No.: US 8,842,931 B2
(45) Date of Patent: Sep. 23, 2014

(54) SYSTEM, METHOD, AND COMPUTER PROGRAM PRODUCT FOR REDUCING NOISE IN AN IMAGE USING DEPTH-BASED SWEEPING OVER IMAGE SAMPLES

(75) Inventors: Peter Schuyler Shirley, Salt Lake City, UT (US); Timo Aila, Helsinki (FI); Jonathan Michael Cohen, Ann Arbor, MI (US); Eric B. Enderton, Berkeley, CA (US); Samuli Laine, Vantaa (FI); Morgan McGuire, Williamstown, MA (US); David Patrick Luebke, Charlottesville, VA (US)

(73) Assignee: NVIDIA Corporation, Santa Clara, CA (US)

( * ) Notice: Subject to any disclaimer, the term of this patent is extended or adjusted under 35 U.S.C. 154(b) by 430 days.

(21) Appl. No.: 13/031,160

(22) Filed: Feb. 18, 2011

(65) Prior Publication Data
US 2012/0213450 A1    Aug. 23, 2012

(51) Int. Cl.
*G06K 9/40* (2006.01)
*H04N 5/00* (2011.01)
*G06T 5/20* (2006.01)
*G06T 5/00* (2006.01)

(52) U.S. Cl.
CPC . *G06T 5/002* (2013.01); *G06T 5/20* (2013.01); *G06T 2207/10028* (2013.01); *G06T 2207/20012* (2013.01)
USPC .............................. 382/275; 382/260; 348/610

(58) Field of Classification Search
None
See application file for complete search history.

(56) References Cited

U.S. PATENT DOCUMENTS

| | | | |
|---|---|---|---|
| 4,897,806 A | 1/1990 | Cook et al. | |
| 5,604,856 A | 2/1997 | Guenter | |
| 6,529,193 B1 | 3/2003 | Herken et al. | |
| 7,359,576 B1 | 4/2008 | Worthington et al. | |
| 8,571,305 B2 * | 10/2013 | Kao | 382/154 |
| 8,582,820 B2 * | 11/2013 | Kane et al. | 382/106 |
| 2003/0103670 A1 * | 6/2003 | Schoelkopf et al. | 382/162 |
| 2004/0164993 A1 * | 8/2004 | Kirkland et al. | 345/592 |
| 2005/0134605 A1 * | 6/2005 | Hoppe et al. | 345/611 |
| 2005/0163345 A1 * | 7/2005 | van den Bergen et al. | 382/103 |
| 2005/0190989 A1 * | 9/2005 | Kondo et al. | 382/293 |
| 2006/0098857 A1 * | 5/2006 | Hawman | 382/131 |
| 2006/0133667 A1 * | 6/2006 | Schoelkopf et al. | 382/162 |
| 2006/0204076 A1 * | 9/2006 | Avinash et al. | 382/154 |

(Continued)

FOREIGN PATENT DOCUMENTS

| | | |
|---|---|---|
| EP | 2339532 A1 | 6/2011 |
| WO | 2008130992 A1 | 10/2008 |
| WO | 2011046607 A2 | 4/2011 |

OTHER PUBLICATIONS

Boulos, S. et al., "Packet-based Whitted and Distribution Ray Tracing," Proceedings of Graphics Interface, 2007, pp. 177-184.

(Continued)

*Primary Examiner* — Randolph I Chu
(74) *Attorney, Agent, or Firm* — Zilka-Kotab, PC

(57) ABSTRACT

A system, method, and computer program product are provided for reducing noise in an image using depth-based on sweeping over image samples. In use, each noisy pixel of an image having noise is identified. Additionally, for each noisy pixel, at least one sample included in each of a plurality of neighboring pixels to the noisy pixel is identified. Furthermore, the samples are swept over at least partially in a depth-based order to identify a value for the noisy pixel that reduces the noise.

25 Claims, 4 Drawing Sheets

(56) References Cited

U.S. PATENT DOCUMENTS

| | | | |
|---|---|---|---|
| 2007/0046686 A1* | 3/2007 | Keller | 345/581 |
| 2007/0092244 A1* | 4/2007 | Pertsel et al. | 396/153 |
| 2007/0183642 A1* | 8/2007 | Ye et al. | 382/131 |
| 2008/0008372 A1* | 1/2008 | Li et al. | 382/131 |
| 2008/0108895 A1* | 5/2008 | Sabol et al. | 600/425 |
| 2008/0219553 A1* | 9/2008 | Akiyama | 382/173 |
| 2008/0316327 A1* | 12/2008 | Steinberg et al. | 348/222.1 |
| 2009/0141026 A1* | 6/2009 | Raab et al. | 345/424 |
| 2009/0153576 A1* | 6/2009 | Keller | 345/581 |
| 2009/0180680 A1* | 7/2009 | Satou et al. | 382/144 |
| 2010/0033618 A1* | 2/2010 | Wong et al. | 348/347 |
| 2010/0061642 A1* | 3/2010 | Kondo et al. | 382/224 |
| 2010/0080482 A1* | 4/2010 | Wong et al. | 382/255 |
| 2010/0103311 A1* | 4/2010 | Makii | 348/369 |
| 2010/0150540 A1* | 6/2010 | Pozniansky et al. | 396/159 |
| 2010/0183236 A1* | 7/2010 | Kang et al. | 382/260 |
| 2010/0208994 A1 | 8/2010 | Yao et al. | |
| 2010/0278415 A1* | 11/2010 | Liege et al. | 382/141 |
| 2011/0103673 A1* | 5/2011 | Rosenstengel | 382/132 |
| 2011/0109755 A1* | 5/2011 | Joshi et al. | 348/208.5 |
| 2011/0199385 A1 | 8/2011 | Enderton | |
| 2011/0211761 A1* | 9/2011 | Wang | 382/203 |
| 2011/0229052 A1* | 9/2011 | Li et al. | 382/264 |
| 2011/0267507 A1* | 11/2011 | Kane et al. | 348/241 |
| 2012/0033852 A1* | 2/2012 | Kennedy et al. | 382/103 |
| 2012/0070042 A1* | 3/2012 | Ioffe et al. | 382/118 |
| 2012/0076362 A1* | 3/2012 | Kane et al. | 382/106 |
| 2013/0293576 A1* | 11/2013 | Zomet | 345/629 |

OTHER PUBLICATIONS

Egan, K. et al., "Frequency Analysis and Sheared Reconstruction for Rendering Motion Blur," ACM Transactions on Graphics, 2009, vol. 28, No. 3, pp. 1-13.

Enderton, E. et al., "Stochastic Transparency," Proceedings of Interactive 3D Graphics and Games, 2010, pp. 157-164, pp. 157-164.

Fatahalian, K. et al., Data-Parallel Rasterization of Micropolygons with Defocus and Motion Blur, Proceedings of High Performance Graphics, 2009, pp. 59-68.

Filion, D. et al., "Starcraft II: Effects and Techniques," Advances in Real-Time Rendering in 3D Graphics and Games Course—SIGGRAPH 2008, 2008, Chapter 5, pp. 133-164.

Heinzle, S. et al., "Motion Blur for EWA Surface Splatting," Eurographics 2010, vol. 29, No. 2, pp. 733-742.

Jensen, H. W. et al., "Optimizing Path Tracing using Noise Reduction Filters," Proceedings of Winter School of Computer Graphics 1995, 1995, pp. 1-10.

Kontkanen, J. et al., "Irradiance Filtering for Monte Carlo Ray Tracing," Monte Carlo and Quasi-Monte Carlo Methods 2004, 2004, pp. 259-272.

Kosloff, T. J. et al., "Depth of Field Postprocessing for Layered Scenes Using Constant-Time Rectangle Spreading," Proceedings of Graphics Interface, 2009, pp. 39-46.

Krivanek, J. et al., "Fast Depth of Field Rendering with Surface Splatting," Proceedings of Computer Graphics International, 2003, pp. 196-201.

Lee, S. et al., "Depth-of-Field Rendering with Multiview Synthesis," ACM Transactions on Graphics, 2009, vol. 28, No. 5, pp. 1-6.

McGuire, M. et al., "Real-time Stochastic Rasterization on Conventional GPU Architectures," High Performance Graphics, 2010, pp. 173-182.

Meyer, M. et al., "Statistical Acceleration for Animated Global Illumination," ACM Transactions on Graphics, 2006, vol. 25, No. 3, pp. 1075-1080.

Overbeck, R. et al., "Adaptive Wavelet Rendering," ACM Transactions on Graphics, Dec. 2009, vol. 28, No. 5, pp. 1-12.

Robison, A. et al., "Image Space Gathering," Proceedings on High Performance Graphics, 2009, pp. 91-98.

Rushmeier, H. et al., "Energy Preserving Non-Linear Filters," Computer Graphics Proceedings, Annual Conference Series, Jul. 24-29, 1994, pp. 131-138.

Scheuermann, T. et al., "Advanced Depth of Field," Game Developers Conference (GDC), 2004, pp. 1-21.

Soler, C. et al., "Fourier Depth of Field," ACM Transactions on Graphics, 2009, vol. 28, No. 2, pp. 1-16.

Ward, G. et al., "A Ray Tracing Solution for Diffuse Interreflection," Computer Graphics, Aug. 1988, vol. 22, No. 4, pp. 85-92.

Xu, R. et al., "Non-Iterative, Robust Monte Carlo Noise Reduction," IEEE Computer Graphics and Applications, vol. 25, No. 2, pp. 31-35.

Combined Search and Examination Report from U.K. Patent Application No. GB1120146.4, dated Mar. 12, 2012.

Office Action from German Patent Application No. 10 2011 087 852.1, dated Apr. 22, 2013.

Dippe, M. A. Z. et al., "Antialiasing Through Stochastic Sampling," ACM Siggraph Computer Graphics, 1985, vol. 19, No. 3, pp. 69-78.

Carpenter, L., "The A-buffer, an Antialiased Hidden Surface Method," ACM Siggraph Computer Graphics, 1984, vol. 18, No. 3, pp. 103-108.

* cited by examiner

SYSTEM, METHOD, AND COMPUTER PROGRAM PRODUCT FOR REDUCING NOISE IN AN IMAGE USING DEPTH-BASED SWEEPING OVER IMAGE SAMPLES

FIELD OF THE INVENTION

The present invention relates to graphics processing, and more particularly to reducing noise in graphical images.

BACKGROUND

Hardware rasterization pipelines have been highly successful at rendering complex scenes. However, they generally have difficulty reproducing some physical camera effects, such as defocus blur, motion blur, etc. Unfortunately, current implementations of graphics renderers produce unbiased but noisy images of scenes that include the advanced camera effects of motion and defocus blur and possibly other effects such as transparency. Similarly, ray tracing programs and cameras also oftentimes generate noisy images having motion/defocus blur, transparency, etc.

Just by way of example, recent progress has been made in using stochastic techniques for interactive rendering, including producing the aforementioned camera effects by randomly varying center of projection and/or time per sample, as in typical offline rendering systems. Unfortunately, at interactive frame rates, the number of random samples available in the foreseeable future is not sufficient to produce visually smooth images using simple unbiased sample averaging. There is thus a need for addressing these and/or other issues associated with the prior art.

SUMMARY

A system, method, and computer program product are provided for reducing noise in an image using depth-based on sweeping over image samples. In use, each noisy pixel of an image having noise is identified. Additionally, for each noisy pixel, at least one sample included in each of a plurality of neighboring pixels to the noisy pixel is identified. Furthermore, the samples are swept over at least partially in a depth-based order to identify a value for the noisy pixel that reduces the noise.

DETAILED DESCRIPTION

Figure 1:
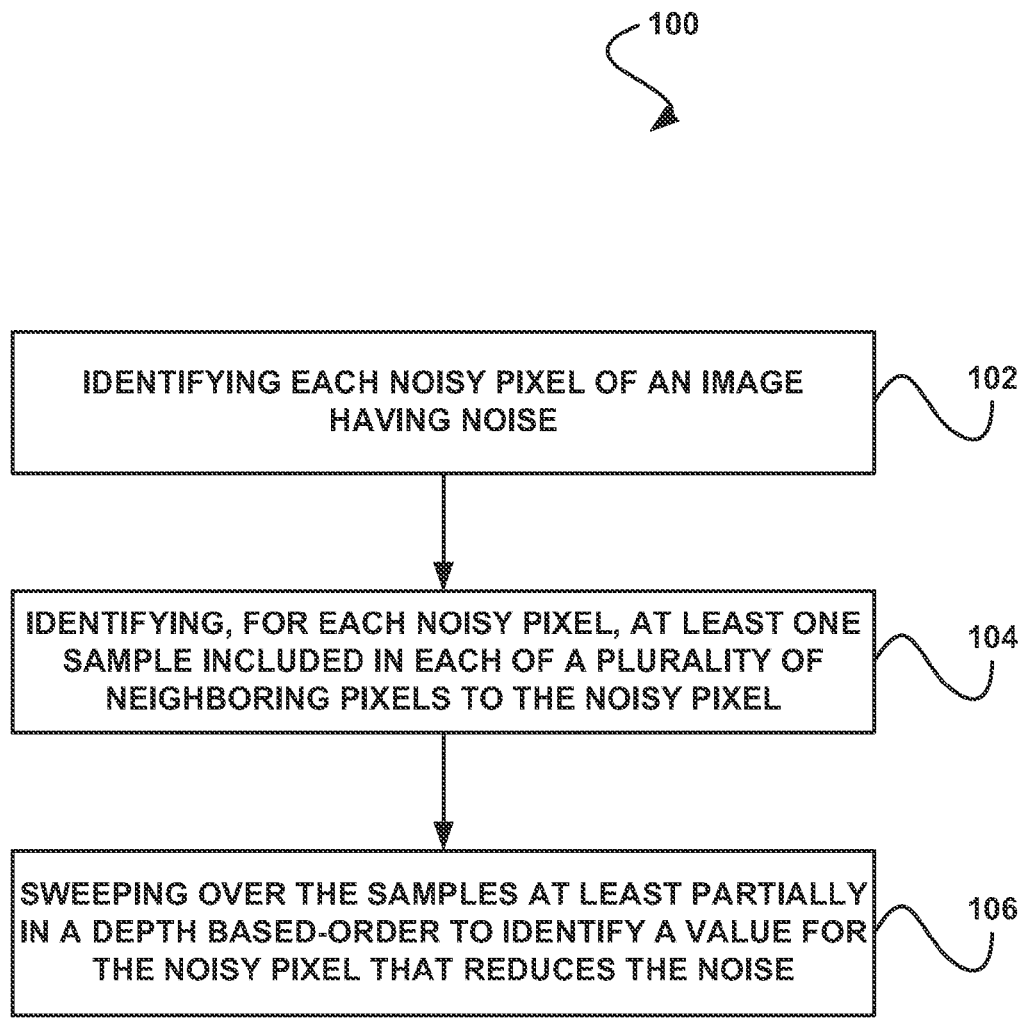
FIG. 1 illustrates a method for reducing noise in an image using depth-based on sweeping over image samples, in accordance with one embodiment.

FIG. 1 illustrates a method 100 for reducing noise in an image using depth-based on sweeping over image samples, in accordance with one embodiment. As shown in operation 102, each noisy pixel of an image having noise is identified. With respect to the present description, the image may include any graphically rendered image or photographically-captured image (e.g. via a digital camera) having the noise. For example, such noise may include one or more undesirable artifacts, as described in more detail below.

To this end, the noisy pixel may be a pixel of the image having (e.g. displaying) at least a portion of the undesirable artifact(s) of the image. In one embodiment, the noise may result from the image having at least one transparent object (i.e. where the pixel is used to display at least a portion of the transparent object). In yet another embodiment, the noise may result from blur included in the image (e.g. a blurry region included in the image). Such blur may include motion blur or depth of field blur.

With respect to depth of field blur, the noise may result from the image having a blurred object that is in front of a sharp (i.e. in-focus) object (i.e. where the pixel is used to display at least a portion of the blurred object in front of the sharp object). For example, such noise may include portions of the sharp object showing in the blurred object. Specifically, this artifact may occur where almost all the samples are likely to be from the front blurry object, but due to random variation, there is one or more samples from the sharp object contributing to the resulting image (e.g. where the variations are visually obvious). Namely, the aforementioned noise may result from sharp features being under-sampled.

As another option, the noise may result from the image having a sharp object in front of a blurred object (i.e. where the pixel is used to display at least a portion of the sharp object in front of the blurred object). For example, such noise may include portions of the blurred object showing in the sharp object (e.g. as if the blurred object has "leaked" on top of the sharp object). This may occur when samples of the blurred background object in neighboring pixels are allowed to influence the value of the noisy pixel.

Additionally, for each noisy pixel, at least one sample included in each of a plurality of neighboring pixels to the noisy pixel is identified. Note operation 104. The neighboring pixels may include pixels within a predetermined proximity to the noisy pixel, in one embodiment. In another embodiment, the neighboring pixels may include pixels that are within a noisy region of the image (i.e. a region having noise) in which the noisy pixel is located.

Moreover, the samples of such neighboring pixels may each include a point or region within an associated neighboring pixel. Thus, each sample may include information associated with the point or region of the neighboring pixel. For example, the information may include a color value (red, green, and blue color values) and a depth (z) value.

It should be noted that the samples may be identified utilizing any desired predetermined sampling algorithm. In one embodiment, the sampling algorithm used to identify the samples may include the stochastic sampling algorithm described in U.S. patent application Ser. No. 12/708,443, filed Feb. 18, 2010, entitled "System, Method, And Computer Program Product For Rendering Pixels With At Least One Semi-Transparent Surface," by Eric Enderton. In another embodiment, the sampling algorithm may include a pseudo-random sampling algorithm described in U.S. Pat. No. 4,897,806, filed Jun. 19, 1985, entitled "Pseudo-random Point Sampling Techniques in Computer Graphics" by Cook et al. In yet another embodiment, the sampling algorithm may include a quasi-random sampling algorithm described in U.S. Pat. No. 6,529,193, filed Jun. 23, 1997, entitled "System and method for generating pixel values for pixels in an image using strictly deterministic methodologies for generating sample points," by Herkin et al.

Furthermore, as shown in operation 106, the samples are swept over at least partially in a depth-based order to identify a value for the noisy pixel that reduces the noise. For example, the value of the noisy pixel may include a color value for the noisy pixel. By identifying the value for the noisy pixel, the noisy pixel may be reconstructed (i.e. from its initial state in operation 102) using the identified value. For example, the noisy pixel may be rendered or otherwise generated for display using the identified value. More information on determining such value will be described in more detail below.

In one embodiment, the depth-based order over which the samples are at least partially swept may include a front-to-back order. For example, processing of the samples to identify the value for the noisy pixel may be performed in the front-to-back order, such that a front-most sample (i.e. sample with a front-most depth value) is processed first, a next front-most sample is processed second, and so forth. Of course, as noted above, the samples may also be swept over in a partial (i.e. approximate) depth-based order, where all of the samples are swept over, but only a portion are swept over in the depth-based order. Such portion may be predetermined (e.g. every other sample), or the manner in which the samples are (approximately) depth-based ordered may be predetermined, as desired. Thus, the samples may optionally be swept over in the (approximate) front-to-back order only once.

In another embodiment, the value for the noisy pixel may be identified using an accumulation performed with respect to the sweeping of the samples. Such accumulation may include adjusting a filter weight based on a filter weight determined for each of the samples. In the present embodiment, the filter weight for a sample may be directly proportional to a level of blur (or transparency in the case of noise due to a transparent object) of the sample. For example, the filter weight for the first sample in the depth-based order may be identified, and further adjusted for each subsequent sample in the depth-based order based on the filter weight of such subsequent samples.

In one exemplary embodiment, a filter weight associated with a level of blur for the first sample in the depth-based order may be identified as the current filter weight, a filter weight associated with a level of blur for a second sample in the depth-based order may be identified and used to adjust the already-adjusted current filter weight, a filter weight associated with a level of blur for a third sample in the depth-based order may be identified and used to adjust the already-adjusted filter weight, etc. until a filter weight associated with a level of blur for a last sample in the depth-based order is identified and used to adjust the already-adjusted current filter weight. Thus, the current filter weight may be updated for each sample, until a final filter weight is determined.

The final filter weight may indicate an area associated with the noisy pixel from which samples are to be selected for use in identifying the value for the noisy pixel. For example, the final filter weight may indicate which of the neighboring pixels will influence the value of the noisy pixel, such that the identified samples of those neighboring pixels (from operation 104) are used (e.g. averaged) to identify the value for the noisy pixel.

To this end, the area having neighboring pixels from which samples are chosen for use in calculating the value for the noisy pixel may be dynamically selected. Such dynamic selection may therefore allow different noisy pixels to be influenced by different sized areas, and therefore different numbers of samples depending on the number of neighboring pixels in those areas. Still yet, by increasing the number of samples contributing to the value of the noisy pixel, the noisy pixel may be blurred (or further blurred where the noisy pixel is already blurred), such that a de-noising blur is effectively provided for the noisy pixel. For example, where the noise of the image is a result of a blurry region included in the image, increasing the number of samples contributing to the value of the noisy pixel may allow for the noisy pixel to be reconstructed in such a way that additional blur is provided to the blurry region (i.e. by the reconstructed noisy pixel). This additional blur may be preferable to viewers of the image since the noise in the image is decreased by the inclusion of the additional blur.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
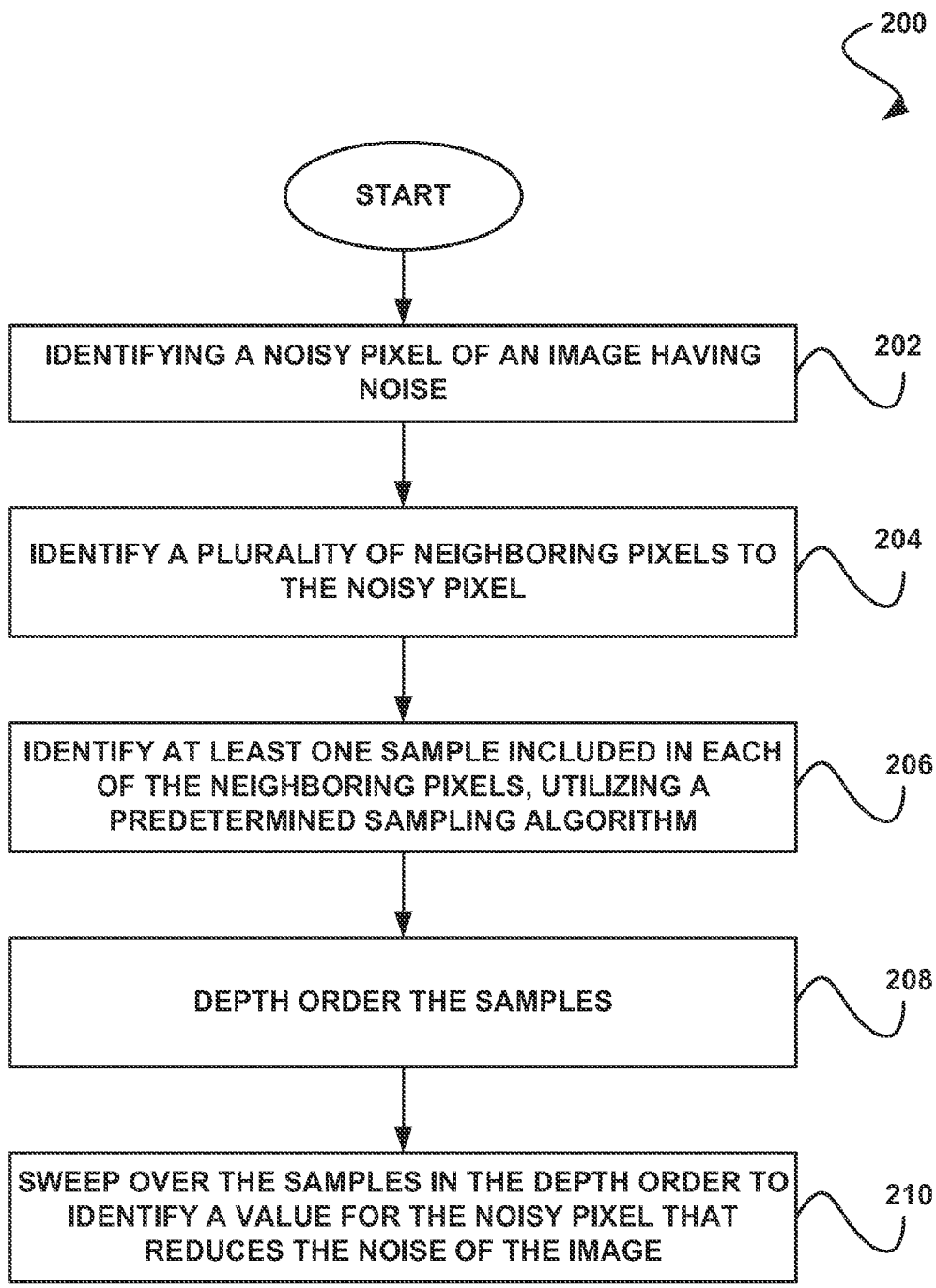
FIG. 2 illustrates a method for reducing noise in a noisy pixel using a depth-based ordering of samples identified with respect to the noisy pixel, in accordance with another embodiment.

FIG. 2 illustrates a method 200 for reducing noise in a noisy pixel using a depth-based ordering of samples identified with respect to the noisy pixel, in accordance with another embodiment. As an option, the method 200 may be carried out in the context of FIG. 1. Of course, however, the method 200 may be carried out in any desired environment. It should also be noted that the aforementioned definitions may apply during the present description.

As shown in operation 202, a noisy pixel of an image having noise is identified. It should be noted that, while the present method 200 is described with respect to a single pixel, the method 200 may be performed for each noisy pixel in the image. In this way, the method 200 may be used to reduce noise of the image by reducing a noise associated with each noisy pixel in the image.

Additionally, as shown in operation 204, a plurality of neighboring pixels to the noisy pixel are identified. For example, a noisy region of the image in which the noisy pixel is located may be identified. Other pixels within such region also having noise may then be identified as the neighboring pixels to the noisy pixel, as an option.

Further, at least one sample included in each of the neighboring pixels is identified, utilizing a predetermined sampling algorithm. Note operation 206. In one embodiment, the number of samples identified from each of the neighboring pixels may be predetermined. In another embodiment, the location of such samples from within each of the neighboring pixels may be determined by the predetermined sampling algorithm.

Still yet, as shown in operation 208, the samples are depth ordered. The samples may be depth ordered using depth information determined for each of the samples when the samples are identified. For example, identification of the samples may include identifying information describing the samples, such as color information and depth information. In one embodiment, the depth ordering may include a front-to-back ordering, such that a sample of the least depth is first in the order and a sample of a greatest depth is last in the order.

Moreover, the samples are swept over in the depth order to identify a value for the noisy pixel that reduces the noise of the image. Note operation 210. One embodiment for sweeping over the samples is described below with respect to the method 300 of FIG. 3.

It should be noted that as another option, the identified samples may be placed in a plurality of depth-ordered bins, where each of the bins is configured to store samples within a different depth range (such that the samples within a bin are not necessarily stored in any particular order). For example, where the image has depth of focus, a first bin in the order may store samples of a depth above a focal plane (i.e. out of focus), a second bin in the order may store samples in the focal plane (i.e. in focus), and a third bin may store samples below the focal plane (i.e. out of focus). Thus, a sample may be placed in one of the bins according to a determination that the depth of the sample is within the depth range associated with the bin.

To this end, sweeping over the samples may include binning the samples, as described above, and sweeping over the bins in the depth-based order. Optionally, the method 300 of FIG. 3 may be applied to the bins, in another embodiment. For example, the filter weights of the unsorted samples within each bin may be accumulated (e.g. without reference to any particular depth-order). The accumulated filter weights for each of the bins may then be combined based on the depth-ordering of the bins, for identifying the value for the noisy pixel. By using bins in this manner, the value of the noisy pixel may be identified with less sorting and less computation than if all of the samples are depth-sorted.

Figure 3:
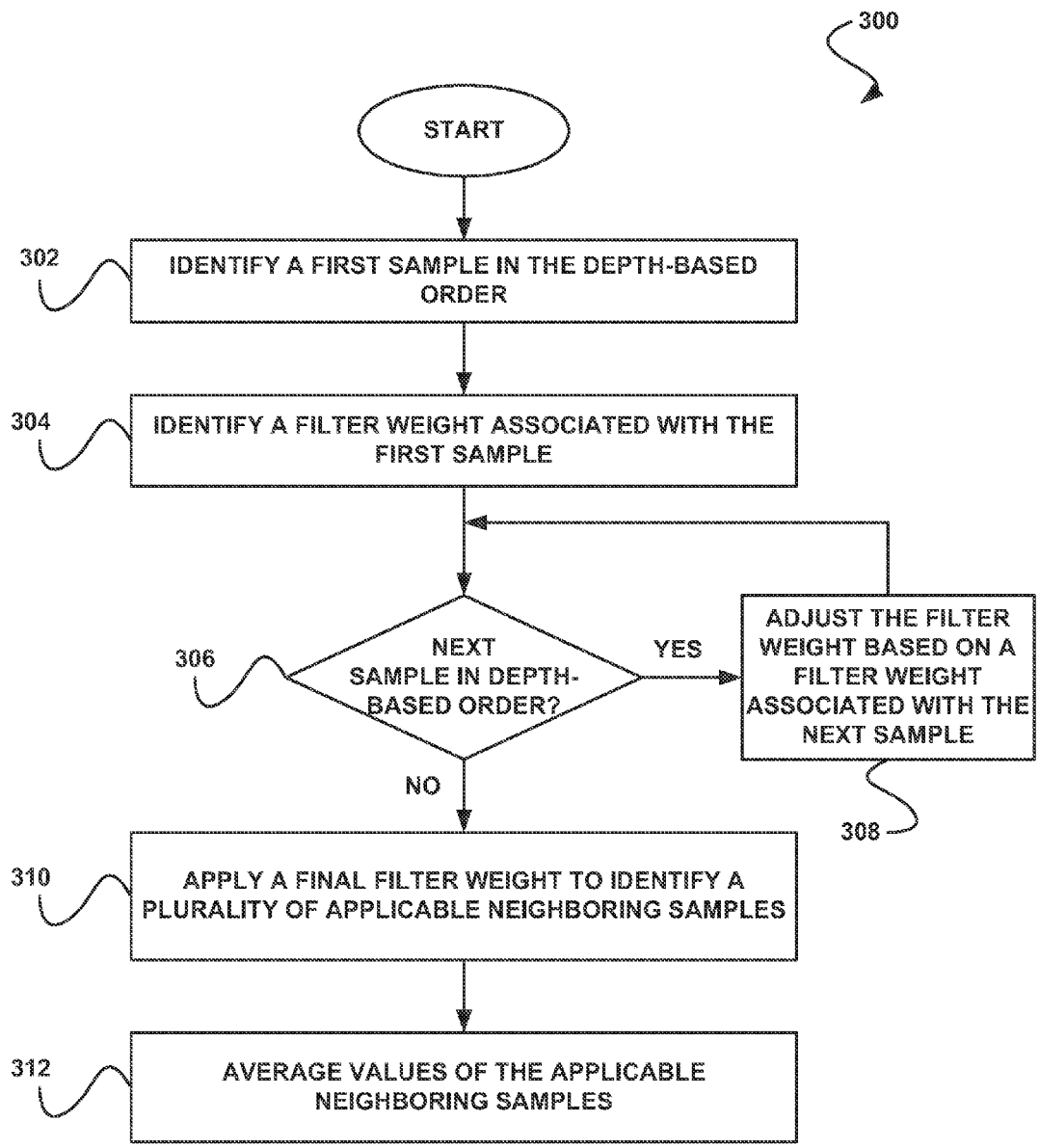
FIG. 3 illustrates a method for sweeping over samples identified with respect to the noisy pixel in a depth-based order, in accordance with yet another embodiment.

FIG. 3 illustrates a method 300 for sweeping over samples identified with respect to the noisy pixel in a depth-based order, in accordance with yet another embodiment. As an option, the present method 300 may be carried out in the context of the functionality and architecture of FIGS. 1-2. For example, the method 300 may be carried out with respect to operation 210 of FIG. 2. Of course, however, the method 300 may be carried out in any desired environment. Again, it should be noted that the aforementioned definitions may apply during the present description.

As shown in operation 302, a first sample in a depth-based order is identified. The first sample may include a sample identified from neighboring pixels of a noisy pixel which has a lowest depth value. For example, the first sample may include the first sample in the depth order described above with respect to operation 208 of FIG. 2.

Furthermore, a filter weight associated with the first sample is identified. Note operation 304. With respect to the present embodiment, the filter weight associated with the first sample indicates an area (e.g. circular area, rectangular area, or any other predetermined shape) surrounding the first sample. For example, the filter weight associated with the first sample may include a value of a radius from the first sample or a diameter of the area with the first sample being at the center of the area.

In one embodiment, the filter weight for the first sample may be a direct function of a level of blur of the sample. For example, as the level of blur (or in the case of transparency, the level of transparency) increases, the filter weight may similarly increase. As an option, each of a plurality of filter weights may be mapped to a different level of blur capable of being associated with a sample. As a further option, the filter weights may be configured by a user for the varying levels of the blur (e.g. where the levels include a single blur value or a range of blur values).

For example, the filter weight may be any programmer-selected function of sample depth, motion, transparency, texture frequency content, or even artistic variables such as visual importance. In one embodiment, the filter weight may be the circle of confusion at the depth of the first sample. Thus, the level of blur for the first sample may optionally be determined, and the associated filter weight identified.

In addition, as shown in decision 306, it is determined whether there is a next sample in the depth-based order. If there is a next sample, the filter weight (i.e. determined with respect to the previous sample in the depth-based order) is adjusted based on a filter weight associated with the next sample. Note operation 308. Accordingly, for each subsequent sample in the depth-based order, the filter weight may be adjusted based on a filter weight of each subsequent sample, and the final adjusted filter weight may be identified as a filter weight associated with a desired level of blur.

Just by way of example, the filter weight of the first sample may be adjusted using the filter weight of a next sample in the depth-based order (to create a first adjusted filter weight), that first adjusted filter weight may be further adjusted using the filter weight of another next sample in the depth-based order (to create a second adjusted filter weight), that second adjusted filter weight may be further adjusted using the filter weight of yet another next sample in the depth-based order (to create a third adjusted filter weight), and so forth.

It should be noted that such adjustment may be based on any desired algorithm that takes into account the depth-based ordering of the samples. For example, a sharp sample in isolation may be associated with a filter weight representing a small area, but as more blurry samples are in front of the sharp sample, the filter weight may be increased such that the area is increased. As another example, a blurry background sample may be associated with a filter weight representing a large area, but as more sharp samples are in front of the blurry sample, the filter weight may be decreased such that the area is decreased.

Once it is determined that there is not another sample in the depth-based order, a final filter weight is applied to determine a plurality of applicable neighboring samples. Note operation 310. In the context of the present embodiment, the final filter weight may include the filter weight associated with the desired level of blur, as described above. Thus, for example, if the desired level of blur is greater than zero (i.e. there is some blur desired), then the filter weight may be larger than a default filter weight otherwise used to identify a value of a pixel without noise (i.e. for which blur is not being applied).

As also note above, each filter weight may indicate an area surrounding the associated sample. Thus, the final filter weight may be used to determine an area surrounding the noisy pixel. It may then be determined which of the samples in the depth-based order are included in the area, and the samples determined to be in the area may be identified as the applicable neighboring samples. To this end, neighboring samples applicable to the noisy pixel may be identified based on the final filter weight associated with the desired level of blur for the noisy pixel.

Still yet, values of the applicable neighboring samples are averaged. Note operation 312. Such values may include the color values for the applicable neighboring samples, in the present embodiment. The result of the averaging may be a value for the noisy pixel. For example, such value may be used for reconstructing the noisy pixel. Of course, it should be noted that any other algorithm other than averaging may be applied to the values for generating a value for the noisy pixel.

Table 1 shows one example of an algorithm capable of being used to implement the method 300 of FIG. 3. Of course, it should be noted that the algorithm shown in Table 1 is set forth for illustrative purposes only, and thus should not be construed as limiting in any way.

TABLE 1

1: sort all samples that can influence this pixel, in depth
2: rgb c = (0, 0, 0);
3: float w = 0;
4: float $a_n$ = 0; // accumulated narrow contribution
5: float $a_w$ = 0; // accumulated wide contribution
6: for each sample i in front-to-back order do
7:   compute $d_i$ from $z_i$ or other inputs TABLE 1-continued

```
 8:    f_n = f(x_i - x_c, y_i - y_c);
 9:    f_w = (1/D^2) * f((x_i - x_c)/D, (y_i - y_c)/D);
10:    if d_i < D then
11:        w_i = (1 - a_w) * f_n + a_w * f_w;
12:        a_n += (1 - a_w) * f_n;
13:    else
14:        w_i = (1 - a_n) * f_w + a_n * f_n;
15:        a_w += (1 - a_n) * f_w;
16:    end if
17:    w += w_i;
18:    c += w_i * c_i;
19: end for
20: c_pixel = c/w;
```

In the algorithm shown in Table 1, D is the width of the filter weight representing a large area (i.e. a wide filter), and filter weight representing a smaller area (i.e. the narrow filter) is the default filter used for unblurred pixels. When all the samples have the same filter weight, the algorithm behaves as desired and either a narrow or wide blurring diameter is used for all samples. When there are blurry samples in front of sharp samples, a filter with more wide weight is used for the sharp samples as desired. When some of the center pixels are sharp (use fn) then the contribution of blurry background pixels is diminished. As an option, the "if" clauses in the algorithm may be blended (e.g. in the spirit of MIPmaps), or clauses for additional intermediate scales (i.e. filter weights) may be added, to prevent a visual break in objects that go in and out of focus.

Tables 2 illustrates a sweeping algorithm that may be used which blends between two scales: 1×1 and 5×5 blocks. In Table 2, N is the number of samples in the widest tile, and ns is the number of samples in a pixel. As a default, de-noising blur is the maximum of the circle of confusion diameter and, if motion blur is to be smoothed, the length of the projected motion vector in pixels.

TABLE 2

```
float box(float x, float radius) {
    return fabs(x) < radius ? 0.5/radius : 0; }
// process samples front-to-back
qsort (s, N, sizeof(*s), compare_sample_z);
float cov_1 = 0.0;
float cov_5 = 0.0;
float cov = 0.0;
rgb sum(0, 0, 0);
for (int i = 0; i < N; i++) {
    // user programmable "denoising" blur diameter
    float D = s[i].denoisingblur;
    float w_1 = (1/ns)*box(s[i].x,0.5)*box(s[i].y,0.5);
    float w_5 = (1/ns)*box(s[i].x,2.5)*box(s[i].y,2.5);
    float w;
    float blend = clamp((D-1)/5, 0, 1);
    w       =     blend * (w_5*(1 - cov_1) + w_1*cov_1);
    cov_5 +=      blend * (w_5*(1 - cov_1));
    w      +=    (1-blend) * (w_1*(1 - cov_5) + w_5*cov_5);
    cov_1 +=     (1-blend) * (w_1*(1 - cov_5));
    cov += w;
    sum += w * s[i].color;
}
image->setPixel(x, y, (1/cov)*sum);
```

Table 3 illustrates a sweeping algorithm that may be used when the block sizes are 1×1 and 7×7 and when there is a visible jump between the scales. As shown, the intermediate scales 3×3 and 5×5 are provided as an improvement.

TABLE 3

```
qsort(s, N, sizeof(*s), compare_sample_z);
float cov_1 = 0.0;
```

TABLE 3-continued

```
float cov_3 = 0.0;
float cov_5 = 0.0;
float cov_7 = 0.0;
float cov = 0.0;
rgb sum(0,0,0);
for (int i = 0; i < N; i++) {
    float D = s[i].denoisingblur;
    float w_1 =    (1/ns)*box(s[i].x,0.5)*box(s[i].y,0.5)
    float w_3 =    (1/ns)*box(s[i].x,0.5)*box(s[i].y,1.5)
    float w_5 =    (1/ns)*box(s[i].x,2.5)*box(s[i].y,2.5)
    float w_7 =    (1/ns)*box(s[i].x,3.5)*box(s[i].y,3.5)
    float w;
    if (D > 7) {
        w =        w_7*(1 - cov_1 - cov_3 - cov_5) +
                   w_1*cov_1 + w_3*cov_3 + w_5*cov_5;
        cov_7 +=   w_7*(1 - cov_1 - cov_3 - cov_5); }
    else if (D > 5) {
        w =        w_5*(1 - cov_1 - cov_3 - cov_7) +
                   w_1*cov_1 + w_3*cov_3 + w_7*cov_7;
        cov_5 +=   w_5*(1 - cov_1 - cov_3 - cov_7); }
    else if (D > 3) {
        w =        w_3*(1 - cov_1 - cov_5 - cov_7) +
                   w_1*cov_1 + w_5*cov_5 + w_7*cov_7;
        cov_3 +=   w_3*(1 - cov_1 - cov_5 - cov_7); }
    else {
        w =        w_1*(1 - cov_3 - cov_5 - cov_7) +
                   w_3*cov_3 + w_5*cov_5 + w_7*cov_7;
        cov_1 +=   w_1*(1 - cov_3 - cov_5 - cov_7); }
    cov += w;
    sum += w * s[i].color;
}
image->setPixel(x, y, (1/cov)*sum);
```

Figure 4:
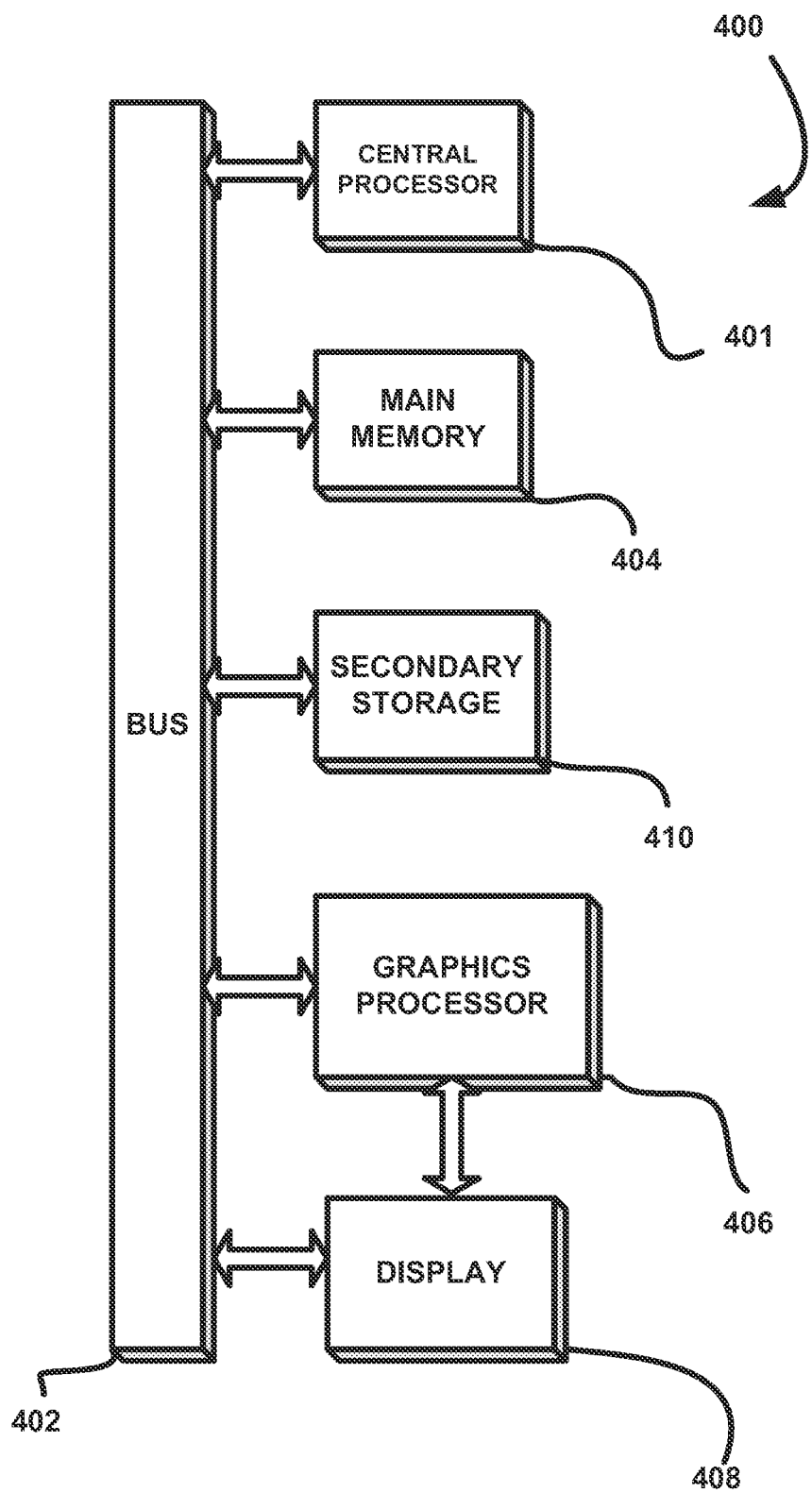
FIG. 4 illustrates an exemplary system in which the various architecture and/or functionality of the various previous embodiments may be implemented.

FIG. 4 illustrates an exemplary system 400 in which the various architecture and/or functionality of the various previous embodiments may be implemented. As shown, a system 400 is provided including at least one host processor 401 which is connected to a communication bus 402. The system 400 also includes a main memory 404. Control logic (software) and data are stored in the main memory 404 which may take the form of random access memory (RAM).

The system 400 also includes a graphics processor 406 and a display 408, i.e. a computer monitor. In one embodiment, the graphics processor 406 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 400 may also include a secondary storage 410. The secondary storage 410 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 404 and/or the secondary storage 410. Such computer programs, when executed, enable the system 400 to perform various functions. Memory 404, storage 410 and/or any other storage are possible examples of computer-readable media.

In one embodiment, the architecture and/or functionality of the various previous figures may be implemented in the context of the host processor 401, graphics processor 406, an integrated circuit (not shown) that is capable of at least a portion of the capabilities of both the host processor 401 and the graphics processor 406, a chipset (i.e. a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 400 may take the form of a desktop computer, lap-top computer, and/or any other type of logic. Still yet, the system 400 may take the form of various other devices m including, but not limited to a personal digital assistant (PDA) device, a mobile phone device, a television, etc.

Further, while not shown, the system 400 may be coupled to a network [e.g. a telecommunications network, local area network (LAN), wireless network, wide area network (WAN) such as the Internet, peer-to-peer network, cable network, etc.) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product embodied on a non-transitory computer readable medium, comprising:
    computer code for identifying each noisy pixel of an image having noise;
    computer code for identifying, for each noisy pixel, at least one sample included in each of a plurality of neighboring pixels to the noisy pixel; and
    computer code for sweeping over the samples at least partially in a depth-based order to determine a final filter weight that identifies a plurality of the samples as applicable neighboring samples, wherein a filter weight of each of the samples is adjusted based on a filter weight for each subsequent sample to determine the final filter weight;
    computer code for computing, based on the applicable neighboring samples, a value for the noisy pixel that reduces the noise.

2. The computer program product of claim 1, wherein the noise includes at least one undesirable artifact, such that the noisy pixel has at least a portion of the at least one undesirable artifact of the image.

3. The computer program product of claim 1, wherein the noise results from depth of field blur included in the image.

4. The computer program product of claim 1, wherein the noise results from motion blur included in the image.

5. The computer program product of claim 1, wherein the noise results from the image having at least one transparent object.

6. The computer program product of claim 1, wherein the neighboring pixels include pixels within a predetermined proximity to the noisy pixel.

7. The computer program product of claim 1, wherein the computer program product is operable such that the at least one sample is identified utilizing a predetermined sampling algorithm.

8. The computer program product of claim 1, wherein the at least one sample includes a point within the neighboring pixel.

9. The computer program product of claim 1, wherein the depth-based order includes a front-to-back order.

10. The computer program product of claim 1, wherein the computer program product is operable such that computing the value comprises
    averaging the applicable neighboring samples.

11. The computer program product of claim 1, wherein the filter weight of each of the samples is associated with a desired level of blur.

12. The computer program product of claim 1, wherein the final filter weight indicates an area surrounding the noisy pixel.

13. The computer program product of claim 12, where the area includes one of a circular area and a rectangular area.

14. The computer program product of claim 1, wherein the filter weight of one of the samples is a value of a radius from the noisy pixel.

15. The computer program product of claim 1, wherein the filter weight of each of the samples is a direct function of a level of blur of the sample.

16. The computer program product of claim 1, wherein the computer program product is operable such that if a desired level of blur is greater than zero, then the filter weight of each of the samples is larger than a default filter weight used to identify a value of a pixel without noise.

17. The computer program product of claim 1, wherein the computer program product is operable such that sweeping over the samples includes binning the samples and sweeping over the bins in the depth-based order.

18. The computer program product of claim 1, further comprising reconstructing the noisy pixel using the identified value.

19. The computer program product of claim 1, wherein the noise is a result of a blurry region included in the image, and the computed value for the noisy pixel provides additional blur to the blurry region.

20. A method, comprising:
    identifying each noisy pixel of an image having noise;
    identifying, for each noisy pixel, at least one sample included in each of a plurality of neighboring pixels to the noisy pixel; and
    sweeping over the samples at least partially in a depth-based order to determine a final filter weight that identifies a plurality of the samples as applicable neighboring samples, wherein a filter weight of each of the samples is adjusted based on a filter weight for each subsequent sample to determine the final filter weight;
    computing, based on the applicable neighboring samples, a value for the noisy pixel that reduces the noise.

21. An apparatus, comprising:
    a processor for:
        identifying each noisy pixel of an image having noise;
        identifying, for each noisy pixel, at least one sample included in each of a plurality of neighboring pixels to the noisy pixel; and
        sweeping over the samples at least partially in a depth-based order to determine a final filter weight that identifies a plurality of the samples as applicable neighboring samples, wherein a filter weight of each of the samples is adjusted based on a filter weight for each subsequent sample to determine the final filter weight;
    computing, based on the applicable neighboring samples, a value for the noisy pixel that reduces the noise.

22. The apparatus of claim 21, wherein the processor remains in communication with memory and a display via a bus.

23. The computer program product of claim 17, wherein the binning of the samples and the sweeping over the bins in the depth-based order includes, for each of the bins, accumulating the filter weights of the samples within the bin.

24. The computer program product of claim 23, wherein the accumulated filter weights for each of the bins are combined based on the depth-based order of the bins for computing the value of the noisy pixel.

25. The computer program product of claim 1, wherein sweeping over the samples in the at least partially depth-based order includes identifying a predetermined portion of the samples, and sweeping over the predetermined portion of the samples in the depth-based order such that only the predetermined portion of the samples are swept over in the depth-based order.

* * * * *